United States Patent
Apland et al.

(10) Patent No.: US 10,053,243 B2
(45) Date of Patent: Aug. 21, 2018

(54) RELEASE SYSTEM FOR DEPLOYING SATELLITES

(71) Applicant: The Johns Hopkins University, Baltimore, MD (US)

(72) Inventors: Clint T. Apland, Elkridge, MD (US); Lake A. Kee, Silver Spring, MD (US); Aaron Q. Rogers, Silver Spring, MD (US)

(73) Assignee: The Johns Hopkins University, Baltimore, MD (US)

( * ) Notice: Subject to any disclaimer, the term of this patent is extended or adjusted under 35 U.S.C. 154(b) by 617 days.

(21) Appl. No.: 15/134,871

(22) Filed: Apr. 21, 2016

(65) Prior Publication Data

US 2016/0311562 A1    Oct. 27, 2016

Related U.S. Application Data

(60) Provisional application No. 62/150,939, filed on Apr. 22, 2015.

(51) Int. Cl.
*B64G 1/64*    (2006.01)

(52) U.S. Cl.
CPC ............ *B64G 1/641* (2013.01); *B64G 1/645* (2013.01); *B64G 2001/643* (2013.01)

(58) Field of Classification Search
CPC ... B64G 1/641; B64G 1/645; B64G 2001/643
See application file for complete search history.

(56) References Cited

U.S. PATENT DOCUMENTS

| 5,743,492 A * | 4/1998 | Chan ................... B64F 1/04 102/274 |
| 5,860,624 A * | 1/1999 | Obry ................... B64G 1/641 244/39 |
| 7,861,976 B2 * | 1/2011 | Holemans ............. B63B 21/08 244/119 |
| 8,789,797 B2 * | 7/2014 | Darooka ............... B64G 1/10 244/159.4 |
| 8,939,409 B2 * | 1/2015 | Apland ................ B64G 1/641 244/173.1 |
| 2002/0000495 A1 * | 1/2002 | Diverde .............. B64G 1/002 244/137.1 |
| 2003/0141416 A1 * | 7/2003 | Telford ............... B64G 1/641 244/158.1 |

* cited by examiner

*Primary Examiner* — Valentina Xavier
(74) *Attorney, Agent, or Firm* — Noah J. Hayward

(57) ABSTRACT

A release system may include a space vehicle separation plate operably coupled to a space vehicle, a launch vehicle adaptor plate operably coupled to a launch vehicle capable of carrying the space vehicle into space or into a ballistic (non-orbital) trajectory for release of the space vehicle from the launch vehicle, an actuator release mechanism assembly and a biasing element assembly. The actuator release mechanism assembly may be configured to separably couple the space vehicle separation plate to the launch vehicle adaptor plate. The biasing element assembly may be configured to provide a configurable force in a first direction normal to a surface of the launch vehicle adaptor plate to separate the space vehicle separation plate from the launch vehicle adaptor plate when the actuator-release mechanism assembly is triggered to release the space vehicle separation plate from the launch vehicle adaptor plate.

20 Claims, 11 Drawing Sheets

RELEASE SYSTEM FOR DEPLOYING SATELLITES

CROSS-REFERENCE TO RELATED APPLICATIONS

This application claims the benefit of U.S. Provisional Application No. 62/150,939 filed on Apr. 22, 2015, the entire contents of which are hereby incorporated herein by reference.

TECHNICAL FIELD

Example embodiments generally relate to satellites that are deployable from launch vehicles and, more particularly, relate to a release system that is useable in connection with various different launch vehicles for facilitating satellite deployment.

BACKGROUND

There are many different launch vehicles that are capable of taking payloads into space either for orbital insertion or on a ballistic re-entry trajectory into Earth atmosphere. For example, Dnepr, Soyuz, Vega, Minotaur I, Minotaur IV, Falcon 1e, Falcon 9, Falcon Heavy, Delta IV, Atlas V, Ariane 5, Ariane 6, Taurus, Antares, Minotaur C, PSLV, GSLV, Super Strypi, Pegasus, ALASA, SWORDS, Electron, Alpha, LauncherOne, New Shepherd, and Athena IIc are examples of such launch vehicles (LVs). These LVs each represent different structures with different capabilities in terms of the payloads they can deliver. Moreover, after carrying a payload such as a satellite into space, the satellite must be released from the LV into space, often using some form of deployment system with a releasable actuator. In some cases, the satellite may further release a smaller satellite.

Releasable actuators can be used to selectively hold parts together. Upon receipt of a signal, the releasable actuator may operate to release the parts. When such release is conducted to separate a space vehicle (SV) such as a satellite from an LV or a re-entry body from a hypersonic vehicle or ballistic trajectory sounding rocket, it is not only important that the release can be conducted in a safe, consistent, and predictable fashion, but also that both the LV and the SV can be sure that the release has been conducted. Accordingly, the provision of some form of LV adaptor deployment system that can facilitate safe and reliable SV release from the LV may be desired.

Currently, release systems tend to be complex and costly. Moreover, such release systems are typically configured such that they can only be used with a limited number of LVs (or even just one). A typical release system may include at least one component or subassembly that stays with the LV and another component or subassembly that is separated and stays with the SV. However, in connection with this structure, the components of the SV are often exposed to both visual inspection and potential damage, as well as possibly able to cause damage to other elements of the LV or other SVs. Furthermore, the piece that, when separated, stays with the SV is an extra component that is attached to the SV and therefore increases the cost, mass, and volume of the SV.

BRIEF SUMMARY OF SOME EXAMPLES

Accordingly, some example embodiments may enable the provision of a release system that is relatively simple and reliable, but also provides many advantages over existing release system solutions. In this regard, some example embodiments may provide for simplicity of integration with a unique structure. Some example embodiments may employ a two-part release system structure including a system interface plate (i.e., launch vehicle adaptor plate) that stays with the LV and a flyaway plate (i.e., space vehicle separation plate) that flies away with the SV when separation is initiated. Example embodiments may therefore provide a release system that provides an efficient load path between the flyaway plate and the release system and that is useable to facilitate reliable separation of SVs from the LV and, in some cases, may also facilitate separation of release of one satellite from another satellite.

In one example embodiment, a release system is provided. The release system may include a space vehicle separation plate operably coupled to a space vehicle, a launch vehicle adaptor plate operably coupled to a launch vehicle capable of carrying the space vehicle into space or into a ballistic (non-orbital) trajectory for release of the space vehicle from the launch vehicle, an actuator release mechanism assembly, and a biasing element assembly. The actuator-release mechanism assembly may be configured to separably couple the space vehicle separation plate to the launch vehicle adaptor plate. The actuator-release mechanism assembly may comprise a clamp assembly configured to clamp an edge of the space vehicle separation plate together with an edge of launch vehicle adaptor plate to fix a surface of the space vehicle separation plate in proximity to a surface of the launch vehicle adaptor plate prior to release of the space vehicle separation plate. The biasing element assembly may be configured to provide a configurable force in a first direction normal to a surface of the launch vehicle adaptor plate to separate the space vehicle separation plate from the launch vehicle adaptor plate when the actuator-release mechanism assembly is triggered to release the space vehicle separation plate from the launch vehicle adaptor plate. In some cases, the described release system and optional shroud provide a unique, low-cost, flexible, reliable means for integrating space vehicles with launch vehicles for transport and deployment. This same release system may be similarly configured for use by space vehicles placed into a re-entry trajectory into Earth's atmosphere by a launch vehicle, sounding rocket, or other ballistic delivery system.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
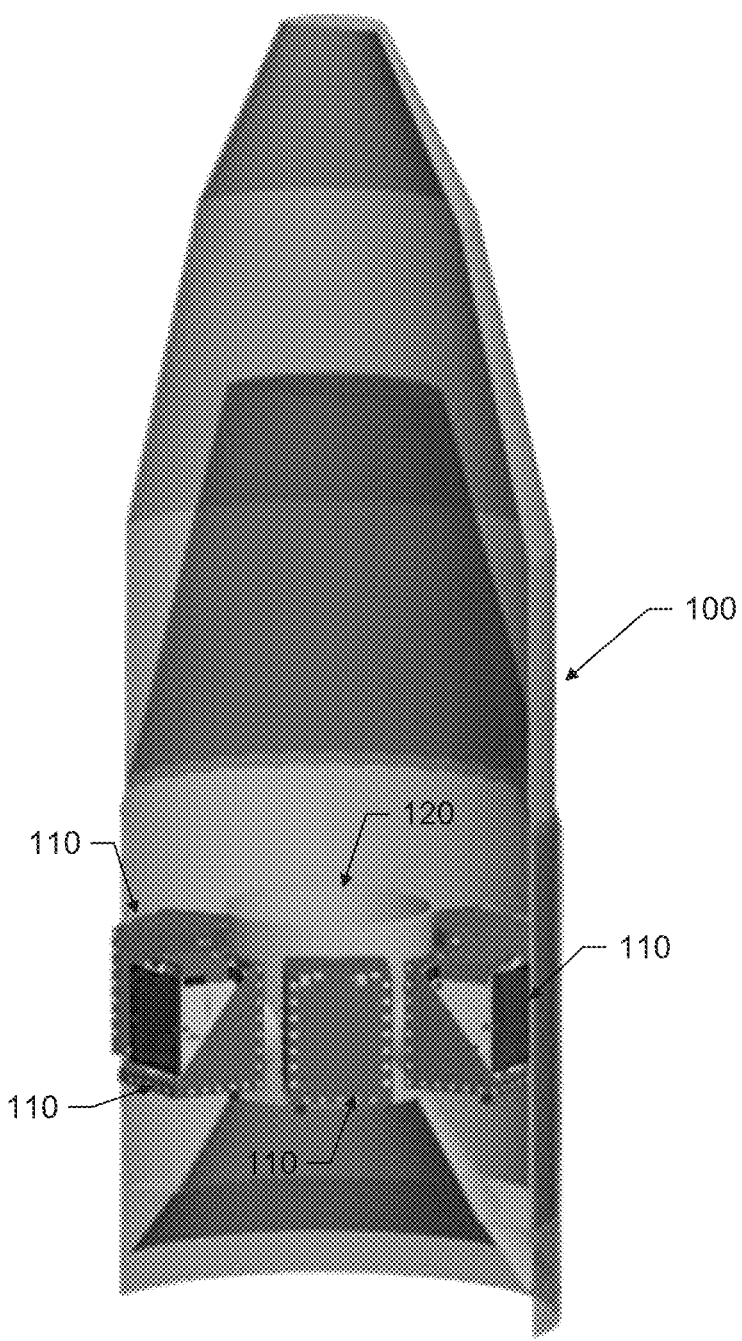
FIG. 1 illustrates an example of an LV incorporating a plurality of SVs in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Some example embodiments may provide for a release system that uses linear Marman-style clamp assemblies in order to operably couple a launch vehicle adaptor plate to a space vehicle separation plate prior to release of the space vehicle separation plate. In this regard, for example, by using a linear Marman-style clamp, the release system may have increased reliability and lower cost thereby enabling participation in or provision of lower cost missions. Moreover, such a release system may also provide more flexible and capable SVs, such as the SV 110 to be provided based on mass, volume, and form-factor constraints.

FIG. 1 illustrates an example of an LV 100 incorporating a plurality of SVs 110 in accordance with an example embodiment. As can be appreciated from FIG. 1, the SVs 110 can be arranged to be supported from exterior edges of a support structure 120 via a release system of an example embodiment. However, it should further be appreciated that one or more SVs 110 could be supported inside the support structure 120 as well, or on a flat table or plate, instead of being supported around external edges of a cylindrical structure such as that which is shown in FIG. 1. In any case, the release system may incorporate one portion that remains attached to the support structure 120 of the LV 100 and one piece that flies away with the SV 110 responsive to release of the SV 110. Moreover, in some embodiments, the piece that flies away with the SV 110 may be an integral part of the SV 110. In any case, the manner by which the SV 110 is attached to the LV 100 using the adaptor, and the relative orientation in which it is deployed, is completely configurable.

Figure 2:
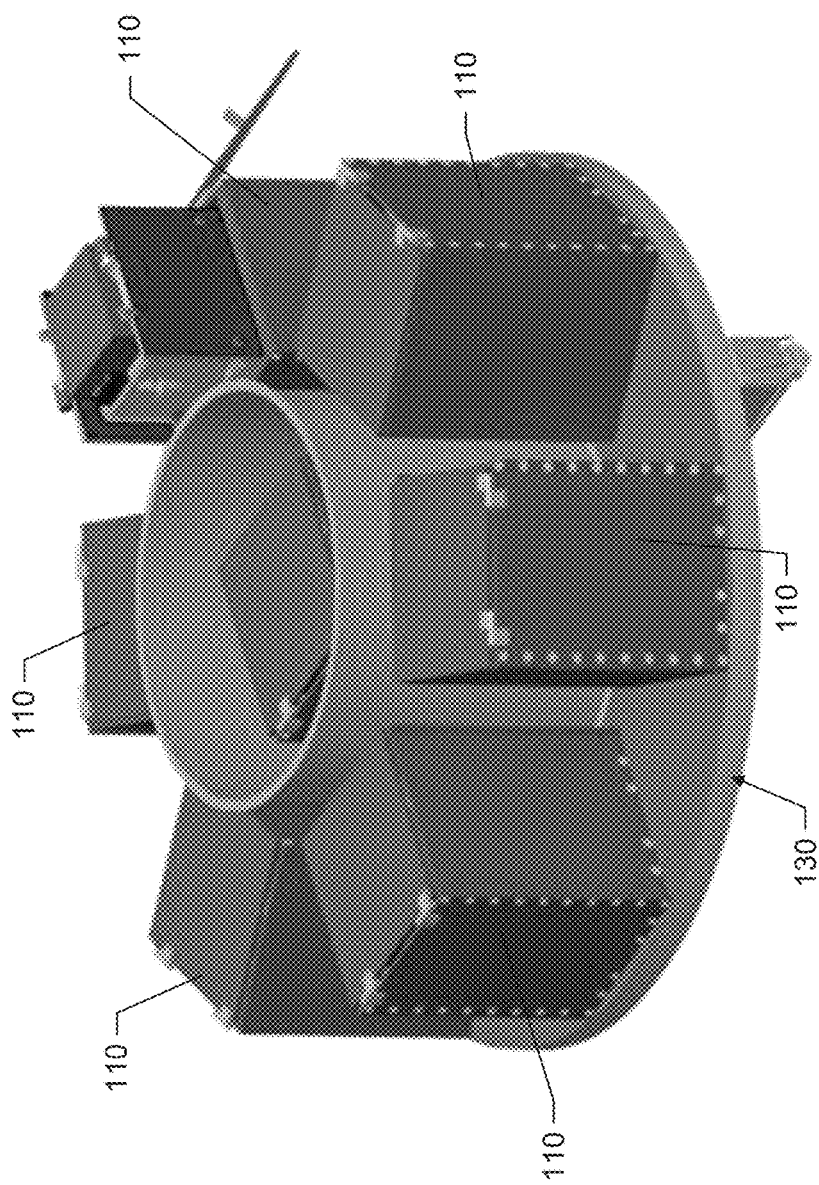
FIG. 2 illustrates a perspective view of an example arrangement utilizing a flat plate support structure according to an example embodiment.

Although the example of FIG. 1 shows a Minotaur IV and Athena IIc accommodation, it should be appreciated that example embodiments are also scalable and useable in connection with other systems as well. In this regard, example embodiments of a system of launch vehicle adaptor structures may enable the separation system to be implemented on other numerous launch vehicles such as, for example, Dnepr, Soyuz, Minotaur I, Falcon 1e, Falcon 9, Falcon Heavy, Delta IV, Atlas V, Ariane 5, Ariane 6, Taurus, Antares, Minotaur C, PSLV, GSLV, Pegasus, ALASA, Super Strypi, Electron, Alpha, LauncherOne, New Shepherd, and SWORDS. Moreover, adaptor support structures that may be employed could include the cylindrical adaptor support structure with radial ports that is shown in FIG. 1, or flat plate structures in which the SVs 110 sit on a flat plate support structure such as support structure 130 shown in FIG. 2. As can be appreciated from FIGS. 1 and 2, all, some, or none of the SVs 110 may employ a shroud or a partial shroud as will be described in greater detail below.

The flat plate adaptors of some examples may be circular and built in four typical, but not exhaustive, diameters (38", 60", 78", and 108"). The 38" diameter flat plate adaptor can be accommodated inside the adaptor rings which may be features of Minotaur I, Minotaur IV, Falcon 1e, Taurus, Antares, Super Strypi, Athena IIc, Electron, Alpha, LauncherOne, New Shepherd and SWORDS launch vehicles. The 60" diameter flat plate adaptor can be accommodated inside the 60" adaptor rings of LVs such as the Minotaur IV, Antares, Minotaur C, Delta IV, Atlas V, Falcon 9, and Falcon launch vehicles. The 78" diameter flat plate adaptor can be attached to a 38" adaptor ring, and can be accommodated inside the fairings of LVs such as Minotaur IV, Taurus, Antares, Athena IIc, and larger launch vehicles. The 108" diameter flat plate adaptor can be attached to the 60" diameter adaptor rings of and fit inside the fairings of LVs such as Dnepr, Antares, PSLV, Delta IV, Atlas V, Falcon 9, and Falcon Heavy launch vehicles. When used in conjunction with one or more Small Launch EELV Secondary Payload Adapter (ESPA) rings or similar cylindrical adaptors with radial ports, a mixed topology of small satellites can be configured, including CubeSats (1U through 6U and beyond), nanosatellites, microsatellites, ESPA-class small satellites, and other larger payloads, on launch vehicles such as the Minotaur IV and Athena IIc launch vehicles. When used in conjunction with one or more ESPA or ESPA Grande rings or similar cylindrical adaptors with radial ports, a mixed topology of small satellites can be configured, including CubeSats (1U through 6U and beyond), nanosatellites, microsatellites, ESPA-class small satellites, and other larger payloads, on launch vehicles such as the Antares, PSLV, Delta IV, Atlas V, Falcon 9 or Falcon Heavy.

Small Launch ESPA, ESPA, ESPA Grande, or other similar cylindrical adaptors with radial ports, can be used to support a mixed topology of small satellites, including CubeSats, nanosatellites, microsatellites, ESPA-class small satellites, and other larger payloads on launch vehicles such as, Dnepr, Antares, PSLV, and larger (Atlas, Delta, Falcon 9 or Heavy) launch vehicles. When cylindrical ported adaptors are used, the shroud can be utilized as an intermediary, which serves as a load path between the small satellites and the launch vehicle, to permit deployment of the SV in any permissible orientation.

Example embodiments may provide a flat plate release system that may be configured to enable mixed topology launches of satellites, including CubeSats (1U through 6U), nanosatellites, microsatellites, ESPA-class small satellites, and other larger payloads in many combinations of primary, secondary, and tertiary designation mixture. The modular nature of example embodiments described herein may maximize area and volume that is available to accommodate the payloads of the space vehicles that are separable from launch vehicles using example embodiments. Example embodiments may also provide significant flexibility in component accommodations relative to canisterized systems such as X-POD, P-POD, ISIS-POD, J-POD, EZ-POD, NLAS, CSD, and/or the like.

Figure 3:
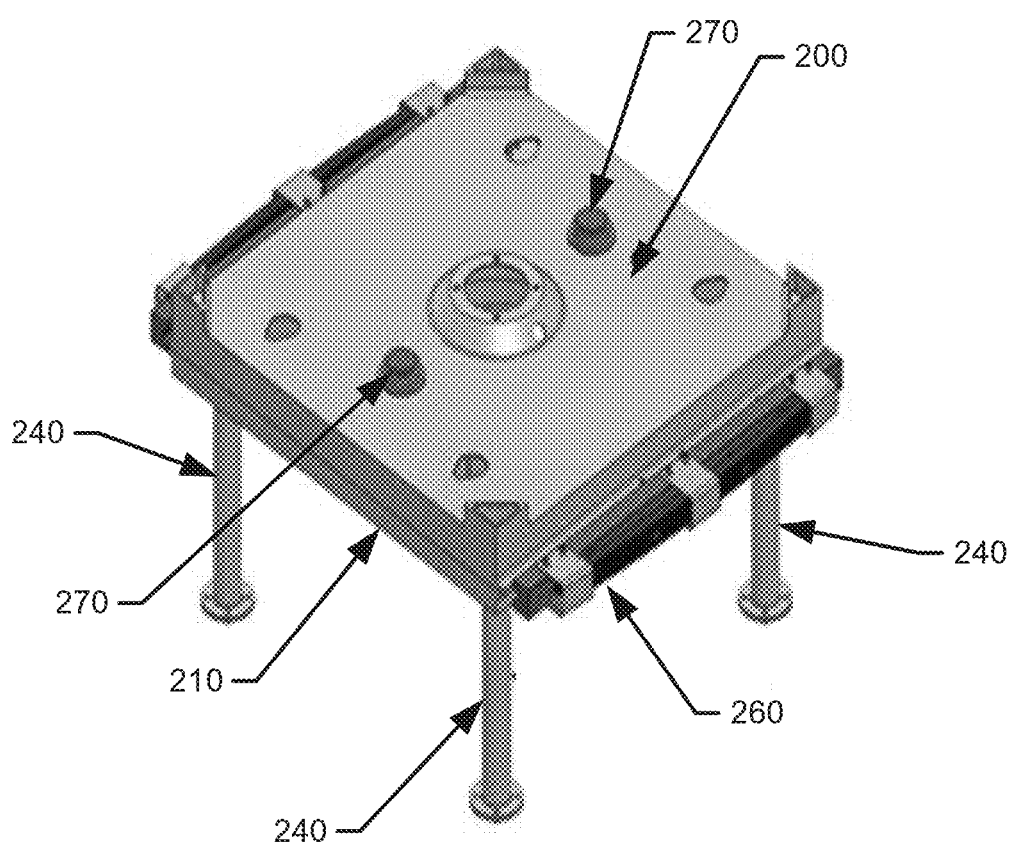
FIG. 3 illustrates a top perspective view of one example arrangement of a release system in accordance with an example embodiment.
Figure 4:
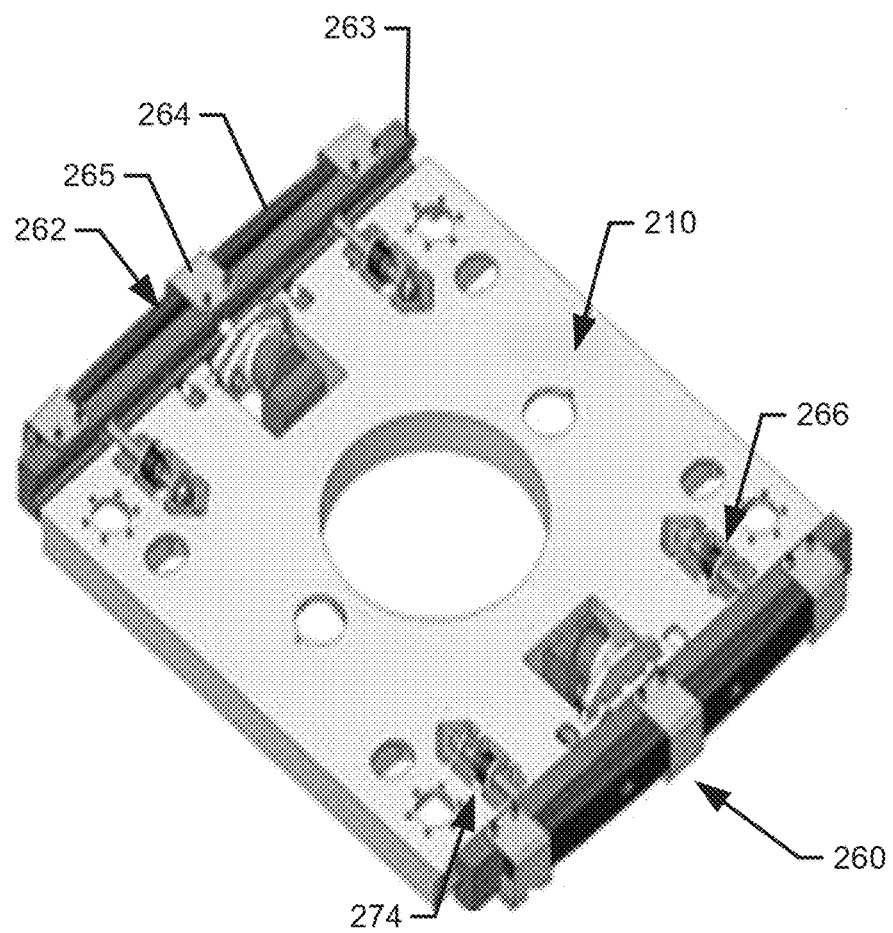
FIG. 4 illustrates a top perspective view of the LV adaptor plate of an example embodiment.
Figure 5:
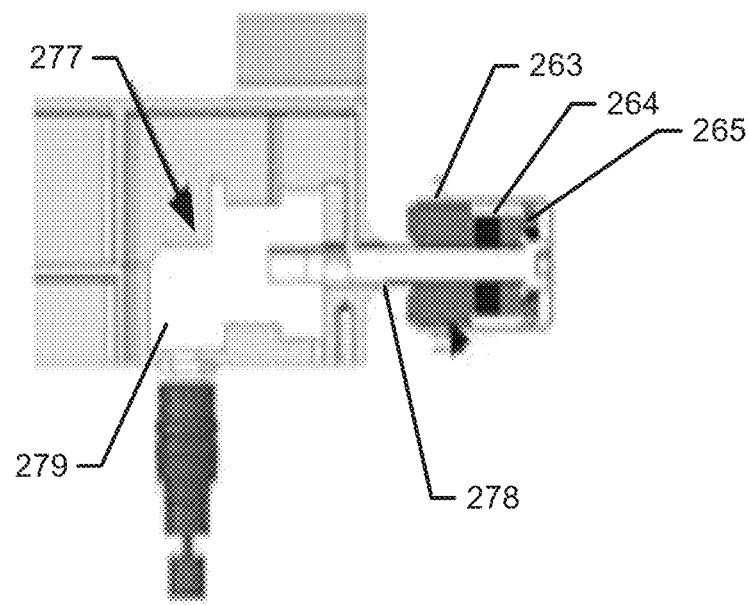
FIG. 5 illustrates a detailed cross sectional view taken along a longitudinal centerline of a separation assembly of an example embodiment.
Figure 6:
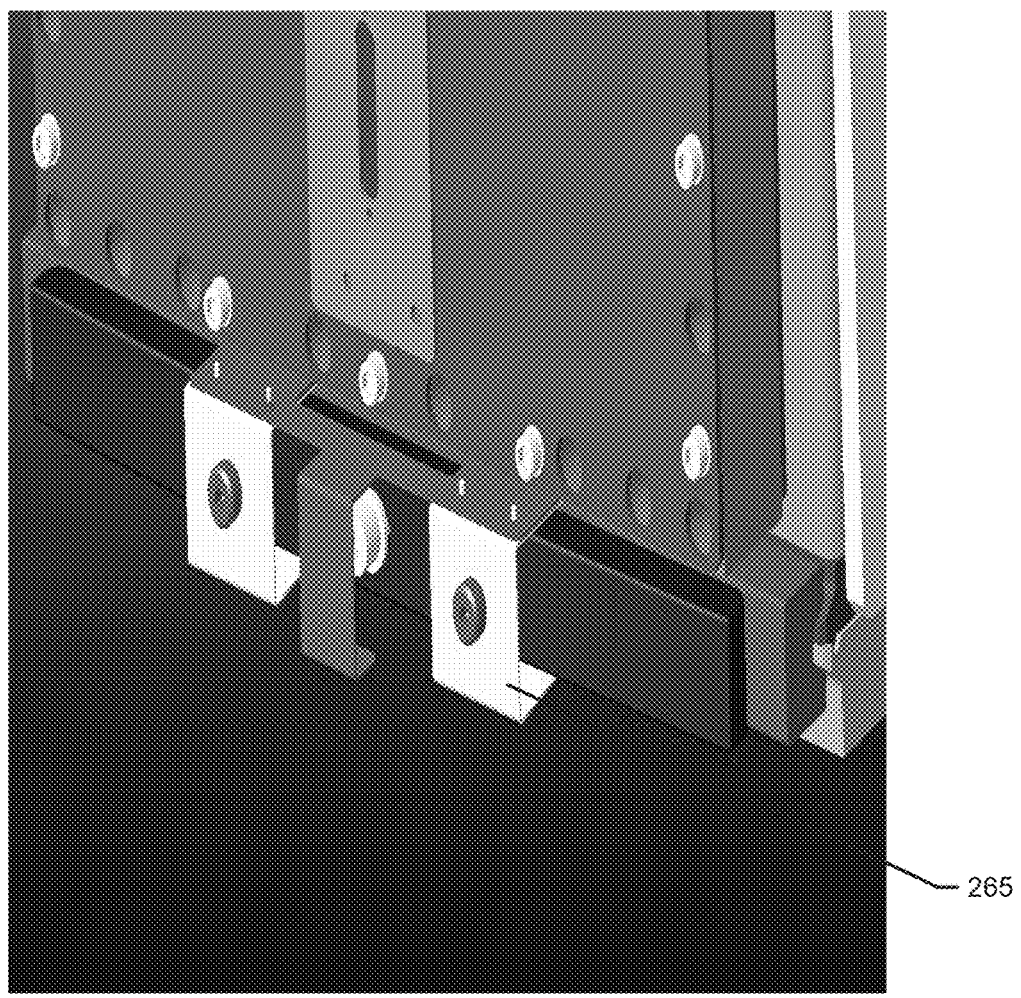
FIG. 6 illustrates a perspective view of a retaining clip of an example embodiment.
Figure 7:
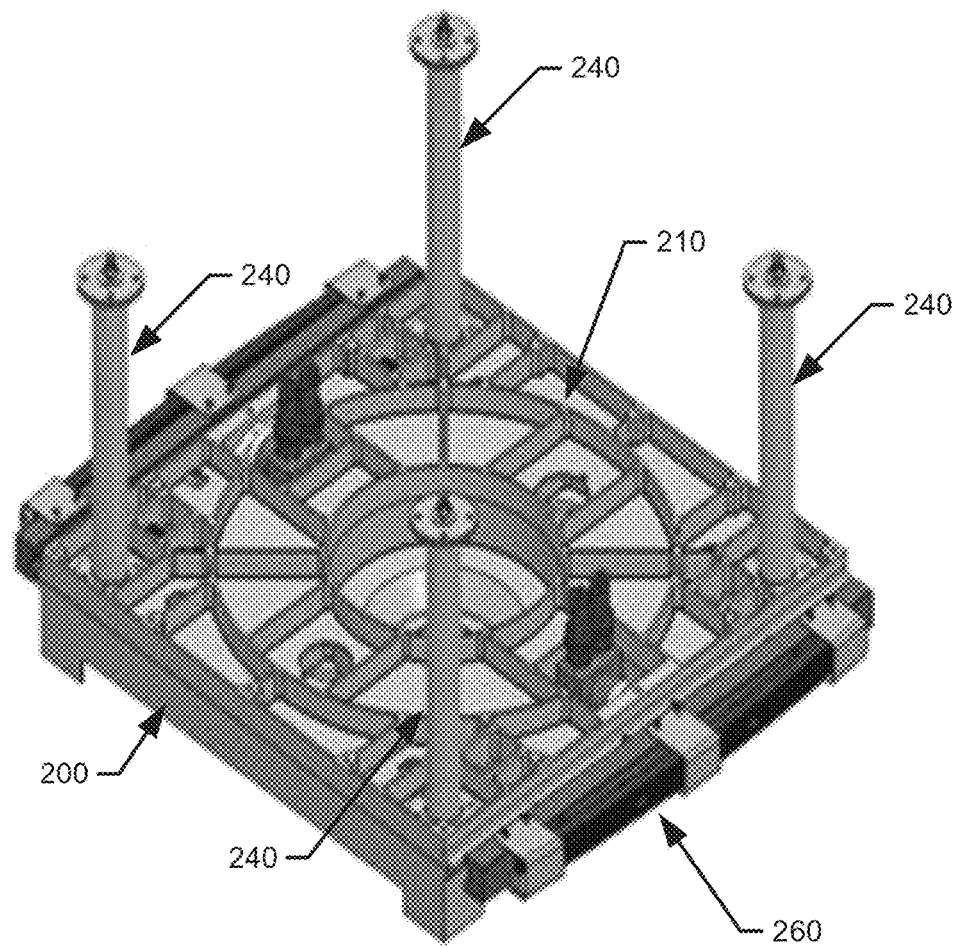
FIG. 7 illustrates a bottom perspective view of the LV adaptor plate of an example embodiment.
Figure 8:
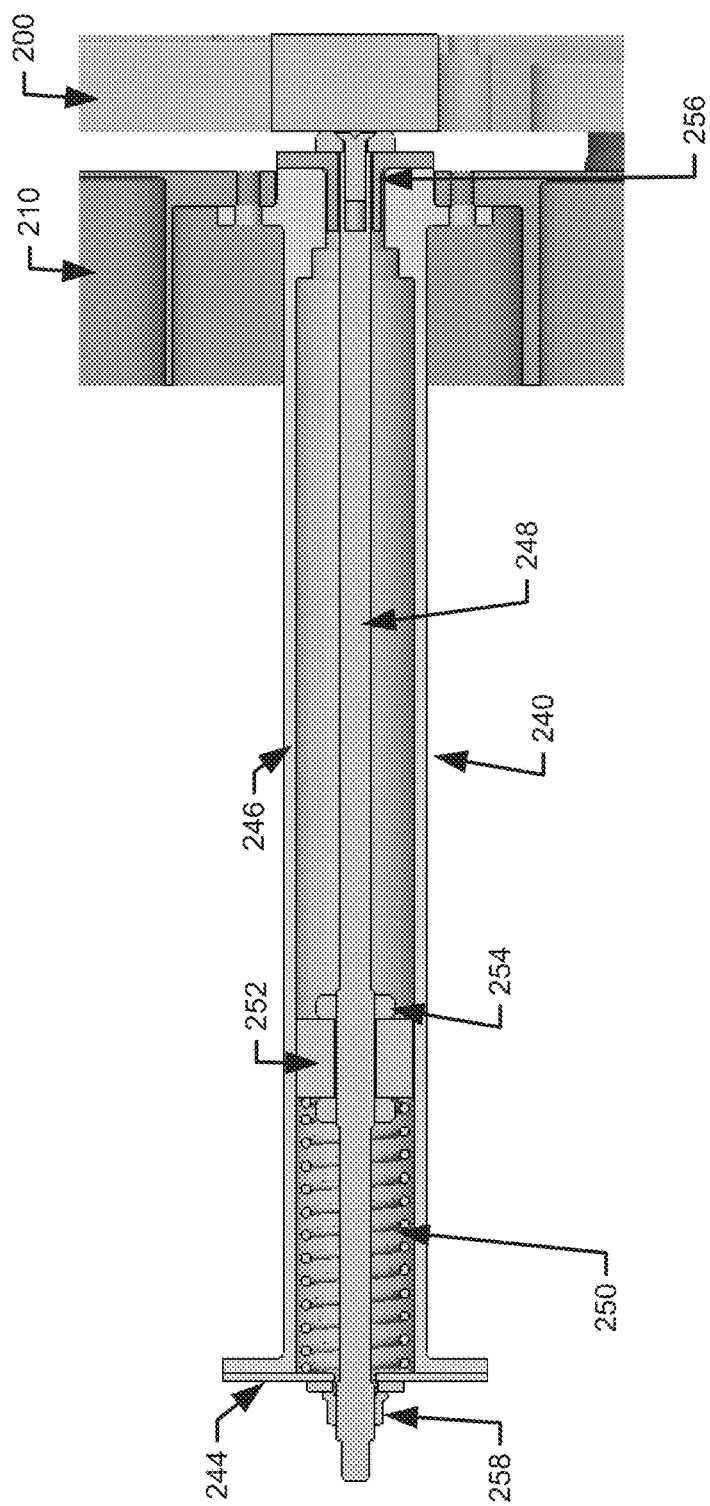
FIG. 8 illustrates a detailed cross sectional view taken along a longitudinal centerline of a separation spring assembly of an example embodiment.

As indicated above, the release system of an example embodiment includes one portion that remains attached to the support structure 120 of the LV 100 and one piece that flies away with the SV 110 responsive to release of the SV 110. FIG. 3 illustrates a top perspective view of one example arrangement of a release system in accordance with an example embodiment. FIG. 4 illustrates a top perspective view of the LV adaptor plate 210 of an example embodiment. FIG. 5 illustrates a detailed cross sectional view taken along a longitudinal centerline of a separation assembly of an example embodiment. FIG. 6 illustrates a perspective view of the retaining clip of an example embodiment. FIG. 7 illustrates a bottom perspective view of the LV adaptor plate 210 of an example embodiment. FIG. 8 is a detailed cross sectional view taken along a longitudinal centerline of a separation spring assembly of an example embodiment. Referring now to FIGS. 3 to 8, an example embodiment of the release system will be described for purposes of explaining one example structure that may be employed in implementation of example embodiments. In this regard, the release system of an example embodiment may include an SV separation plate 200 operably coupled to an LV adaptor plate 210. In this example, the LV adaptor plate 210 is one example of a structure for the portion that remains attached to the support structure 120 of the LV 100. Meanwhile, the SV separation plate 200 is one example of a structure for the piece that flies away with the SV 110 responsive to release of the SV 110. In some cases, as will be seen below, the LV adaptor plate 210 may further be fitted with a shroud that may enclose or partially enclose the small satellite such as SV 110. An embodiment including the shroud will be described in reference to FIGS. 9 to 12 below.

The LV adaptor plate 210 and the SV separation plate 200 may each be substantially flat plates that may be machined, cast, or produced by any other suitable method. The LV adaptor plate 210 and the SV separation plate 200 may each be substantially square or rectangular in shape, although other shapes could be employed, if desired. The length and width dimensions of the LV adaptor plate 210 and the SV separation plate 200 defining the planar faces of each plate may be substantially larger than the height dimension of each plate (e.g., the dimension defining the distance between the respective planar faces of LV adaptor plate 210 and the respective planar faces of the SV separation plate 200). In an example embodiment, the LV adaptor plate 210 may have substantially the same dimensions as the SV separation plate 200. For example, both the LV adaptor plate 210 and the SV separation plate 200 may each be an 18" square by 2" height or thickness.

As can be seen in FIGS. 3-8, the LV adaptor plate 210 and the SV separation plate 200 may each have an opening defined at a center portion thereof, as a result of the employment of an actuator-release mechanism assembly 260 disposed at the periphery of the release system. Thus, when the LV adaptor plate 210 and the SV separation plate 200 are mated together, the openings in each plate may be substantially overlapping. The openings may provide access to components or circuitry in some embodiments. In some example embodiments, the opening may filled with a part that is bonded or otherwise mechanically fastened into the opening. The bonded or mechanically-fastened part may be customizable for the specific SV 110 being employed thereby allowing the rest of the release system to be standardized for ease of manufacturing.

In some cases, the separating half of the release system (i.e., the SV separation plate 200) may also serve as the bottom baseplate structure of the SV 110 for either integrity or mass savings purposes. By serving as the bottom baseplate structure, the SV separation plate 200 may be used to accommodate all associated equipment of the SV 110, including but not limited to, electrical assemblies, avionic units, communication devices, mechanical/structural elements, propulsion systems, mechanisms, deployables, power generation devices, attitude determination and control components, and a thermal management system. However, in other example embodiments, the SV separation plate 200 may be operably coupled to (e.g., by bolting) an existing structure of the SV 110.

The LV adaptor plate 210 may include separation connectors, an optional T-0 separable purge connector, tailorable separation springs, separation nuts, clamp assemblies, and an optional shroud system. The SV separation plate 200 may include features for attaching the space vehicle-side umbilical connectors 270, all within the shroud 300 (see FIG. 9). Mating of the LV adaptor plate 210 and the SV separation plate 200 may be employed to cause the SV 110 to be fixed proximate to the LV 100 until the SV 110 is released. The components that affix the LV adaptor plate 210 to the SV separation plate 200 may provide for reliable connection of the LV adaptor plate 210 to the SV separation plate 200 prior to release, safe and reliable release, and accurate indication of pre-release and post-release statuses. To accomplish this, the components may include at least one actuator-release mechanism assembly 260 that is configured to securely couple the LV adaptor plate 210 and the SV separation plate 200 until a separation signal is provided thereto. After receipt of the separation signal, the actuator-release mechanism assembly 260 may be configured to release the SV separation plate 200 from the LV adaptor plate 210.

Although the LV adaptor plate 210 and the SV separation plate 200 may no longer be held in contact with each other after the separation signal is received due to the operation of the actuator-release mechanism assembly 260, guidance and facilitation of the release may still be desirable to ensure that the LV adaptor plate 210 and the SV separation plate 200 separate from each other in a safe and relatively controlled manner. Accordingly, in some embodiments, at least one biasing element assembly may further be provided to push or urge the SV separation plate 200 away from the LV adaptor plate 210 after the separation signal is received. The biasing element assembly may ensure that the SV separation plate 200 has configurable linear deployment velocity with minimal rotational component and therefore will not re-contact the LV adaptor plate 210 upon separation.

Although it may be possible to configure a system in which the push provided by the biasing element assembly is only initiated after or responsive to the separation signal, the biasing element assembly may provide for a simpler construction in which the biasing force is always present and, responsive to a release of the SV separation plate 200 from the LV adaptor plate 210, the biasing element assembly may already be poised and ready to provide a force to push the SV separation plate 200 away from the LV adaptor plate 210. In an example embodiment, multiple biasing element assemblies may be distributed at even distances from each other to provide a consistently applied separation force.

As shown in FIG. 4, the actuator-release mechanism assembly 260 may include a clamp assembly 262, separation assembly 266, and a clamp pushoff assembly 274. The clamp assembly 262 may include a clamp bar 263. In some cases, the clamp bar 263 may be a linear Marman-style clamp bar. The linear Marman-style design of the clamp bar 263 may use fewer, more simple parts than systems using discrete rounded clamps and fewer release devices than many other systems. The clamp bar 263 may be disposed about the periphery of one side of the SV separation plate 200 and the LV adaptor plate 210 in order to fix the SV separation plate 200 proximate to the LV adaptor plate 210. Moreover, the clamp bar 263 may extend parallel to an edge of the SV separation plate 200 and the LV adaptor plate 210. The linear Marman-style design of the clamp bar 263 may be configured such that the clamp bar 263 is C-shaped. Therefore, the clamp bar 263 may include two angled lips, where one lip may be configured to rest against an edge of the SV separation plate 200 and a second lip may be configured to rest against an edge of the LV adaptor plate 210. Accordingly, the two lips of the clamp bar 263 may be configured to clamp the SV separation plate 200 and the LV adaptor plate 210 together.

In further example embodiments, the clamp assembly 262 may also include a preload bar 264. As shown in FIG. 4, the preload bar 264 may be disposed parallel to and along the length of the clamp bar 263. In cases where the clamp assembly 262 includes a preload bar 264, a portion or portions of the clamp bar 263 and the preload bar 264 may be surrounded by at least one retaining clip 265. The retaining clip 265 may be designed such that it also has a C-shape design in order to retain the clamp bar 263, the preload bar 264, and the separation bolt 278 upon release of the clamp assembly 262. In cases, where one retaining clip 265 (or a pair of retaining clips 265 working together as an assembly (see FIG. 6)) is used, the retaining clip 265 will be disposed about or along the center or middle of the clamp bar 263 and the preload bar 264 (see FIG. 6). However, in other cases, where two retaining clips 265 are used, one retaining clip 265 may be fixed proximate one end of the clamp bar 263 and the preload bar 264 and the other retaining clip 265 proximate the other end of the clamp bar 263 and the preload bar 264. As shown in FIG. 4, three retaining clips 265 may also be used in some example embodiments. When three retaining clips 265 are used, one retaining clip 265 may be disposed about the center or middle of the preload bar 264 and the clamp bar 263, and the other two retaining clips 265 may be disposed proximate each end of the preload bar 264 and clamp bar 263. Accordingly, various numbers and configurations of the retaining clips 265 may be used in accordance with an example embodiment disclosed herein.

The retaining clips 265 are configured to maintain vertical alignment between the clamp bar 263 and the preload bar 264. Moreover, the retaining clips 265 effectively capture the clamp bar 263, the preload bar 264, and the separation bolt 278 upon release of the actuator-release mechanism assembly 260 in order to ensure that neither the preload bar 264, the clamp bar 263, nor the separation bolt 278 re-contact the release system after the actuator-release mechanism assembly 260 is actuated (see FIG. 6).

The preload bar 264 is configured to distribute sufficient preload force along the length of the clamp bar 263 allowing the clamp bar 263 to maintain sufficient preload at the corners of the release system and to ensure robust, stiff constraint of the release system. In some cases, the preload bar 264 may be curved outward relative to the clamp bar 263 so the preload bar 264 supplies consistent pressure along the length of the clamp bar 263. The consistent pressure supplied by the preload bar 264 enables the clamp bar 263 to maintain consistent pressure along the edge of the release system. Even further, the preload bar 264 may extend along and have the same approximate length as the clamp bar 263. However, as shown in FIG. 4, in other example embodiments, the preload bar 264 may only extend along a portion of the clamp bar 263 such that each end of the preload bar 264 terminates proximate to or near the end of the clamp bar 263.

As mentioned above, the actuator-release mechanism assembly 260 may also include a separation assembly 266 and a clamp pushoff assembly 274 disposed in a respective cavity or opening formed within the SV separation plate 200 or LV adaptor plate 210. The separation assembly 266 may be located perpendicular to the center or middle of the clamp assembly 262. The separation assembly 266 may be used to generate and maintain preload between the clamp assembly 262 and the SV separation plate 200 and LV adaptor plate 210 until the separation assembly 266 is actuated.

As shown in FIG. 5, the separation assembly 266 may include a separation nut 277 and a separation bolt 278. In some cases, the separation nut 277 may extend through an opening or cavity 279 formed within the SV separation plate 200 or LV adaptor plate 210. The separation assembly 266 may lie perpendicular to the length of the clamp assembly 262. When an electronic actuation signal is received, the separation bolt 278 may disengage from the separation nut 277 thereby ejecting the separation bolt 278 out of the cavity 279 in a direction towards the clamp assembly 272. In other words, the separation bolt 278 may move in a direction toward the clamp bar 273 effectively urging the clamp assembly 272 away from the periphery of the SV separation plate 200 and LV adaptor plate 210. It should be understood that the separation assembly 266 is not limited to a separation nut 277 and a separation bolt 278 but may include any device capable of releasing the clamp assembly 272. For example, in some embodiments, the separation assembly 266 may include explosive bolts, shape memory alloy initiated devices, other non-explosive actuated devices, or frangible bolts.

In response to the separation bolt 278 disengaging from the separation nut 377, the clamp pushoff assembly 274 may be configured to aid or assist in urging the clamp assembly 272 away from the periphery of the SV separation plate 200 and LV adaptor plate 210. Accordingly, the clamp pushoff assembly 274 may include a biasing element such as a spring and may be disposed in an opening or cavity formed within the SV separation plate 200 or the LV adaptor plate 210. Once the separation nut 277 has been released, the spring acts in a direction perpendicular to the length of the clamp assembly 272 in order to urge the clamp assembly 272 away from or off of the SV separation plate 200 and LV adaptor plate 210. Similar to the biasing element assembly described above, the clamp pushoff assembly 274 may also provide for a simpler construction in which the biasing force is always present and, responsive to a release of the separation nut 277, the clamp pushoff assembly 274 may already be poised and ready to provide a force to push the clamp assembly 262 away from the edge of the SV separation plate 200 and the LV adaptor plate 210.

In some example embodiments, the actuator-release mechanism may include more than one clamp assembly 262, separation assembly 266, or clamp pushoff assembly 274.

For example, the release system may include two clamp assemblies 262, two separation assemblies 266, and at least two clamp pushoff assemblies 274. In cases, where two clamp assemblies 262 are employed, the clamp assemblies 262 will be disposed at or in correspondence with opposite sides of the release system. Moreover, a first and second separation assembly 266 will be disposed at or proximate to the center of each of the respective clamp assemblies 262, and at least one clamp pushoff assembly 274 may be disposed proximate the center of the clamp assembly 262. In other cases, there may be two clamp pushoff assemblies 274 equally spaced along each of the clamp assemblies 262 or at each end of each of the clamp assemblies 262.

In other example embodiments, the clamp assembly 262 may be employed at or in correspondence with each edge of the release system. Accordingly, when clamp assemblies 262 are disposed at each side or edge of the release system, the clamp bar 263 and the preload bar 264 may also be disposed at each side or edge of the release system. For example, clamp assemblies 262 may be disposed on all four sides of a rectangular-shaped release system or three sides of a hexagonal-shaped release system. In some cases, when the clamp bar 263 and the preload bar 264 are disposed at each edge of the release system, each of the clamp bar 263 and the preload bar 264 may be two, three, or four separately-formed clamp bars 263 and preload bars 264. For example, one separately formed clamp bar 263 and preload bar 264 may be disposed at each edge of the release system.

Regardless of the number of clamp assemblies 262 used in the release system, a separation assembly 262 may be disposed at or proximate the center of each of the respective clamp assemblies 262 used in the release system. Even further, at least one clamp pushoff assembly 274 will be used in conjunction with the separation assembly 262 in order to release the clamp assembly 262 from the edge(s) of the release system. For example, the clamp pushoff assembly 274 may be employed with respect to each end of the clamp assembly 262 used in the release system. However, in other cases, only one clamp pushoff assembly 274 may be utilized. When only one clamp pushoff assembly 274 is employed, the clamp pushoff assembly 274 may be located proximate the center of the clamp assembly 262. In other cases, when more than one clamp pushoff assembly 274 is used, the clamp pushoff assemblies 274 may each be equally spaced in respect to the length of the clamp assembly 262 or, as described above, located proximate the end of each clamp assembly 262.

As indicated above, the separation of the SV separation plate 200 from the LV adapter plate 210 may be aided by the biasing element assembly. In an example embodiment, the biasing element assembly may be embodied as one or more separation springs 240. The separation springs 240 may extend through a separation spring receiving opening 242 formed in the LV adaptor plate 210 in a direction that is normal to a surface of the LV adaptor plate 210. In an example embodiment, four separation springs 240 may be provided spaced apart from each other equidistant from each other and distributed over the surface of the LV adaptor plate 210 to push the SV separation plate 200 away from the LV adaptor plate 210 after the separation assembly 266 is actuated.

As shown in FIG. 8, the separation springs 240 may include a bottom plate 244 and a tube 246 that house a rod 248 and a spring 250. The bottom plate 244 may be coupled to the LV 100 via any suitable fixing means (e.g., one or more nuts, bolts, weld joints, and/or the like). The spring 250 may be biased against the bottom plate 244 to exert a force on the rod 248 in a direction away from the bottom plate 244. A lower bushing 252 may couple the rod to the spring 250 and a locating nut 254 may position the rod 248 proximate to the lower bushing 252 to pass the force through the rod 248 onto an upper bushing assembly 256 that may push against the SV separation plate 200. A retaining screw and safety nut 258 may couple the bottom plate 244 to the rod 248 as a temporary safety device. The safety nut 258 is removed before launch. Although FIGS. 3 and 7 show an example in which four separation springs are provided, it should be appreciated that less or more separation springs could be employed in alternative embodiments.

In an example embodiment, one or more separation umbilical connectors 270 may also be provided to indicate when the separation has occurred. The umbilical connectors 270 may include pins that, when disconnected from each other during a separation event, create an open circuit so that both the SV 110 and the LV 100 can know reliably that separation has occurred. In other example embodiments, in order to detect a separation event, an electronic switch assembly may be provided to indicate when the separation has occurred. For example, the SV separation plate 200 may include an electronic switch with an actuator such as a plunger or lever, and the LV adaptor plate 210 may include a surface intended to contact the switch actuator. When the SV separation plate 200 and the LV adaptor plate 210 are fixed proximate to each other, the switch actuator will effect an electrical change in state signifying separation between the SV separation plate 200 and LV adaptor plate 210. Accordingly, the switch may be actuated when the SV separation plate 200 releases from the LV adaptor plate 210. Therefore, the SV 110 may be configured to receive a signal that it has separated from the LV 100 upon detection of actuation of the switch. Further, the LV 100 may be configured to receive a signal that it has separated from the SV 110 upon detection of the actuation of a complementary switch or set of switches.

Thus, for example, the release system functions to provide reliable separation from the launch vehicle, and corresponding reliable indication of the same. False alarms may be prevented, and safe and reliable separation may also be achieved using example embodiments. Moreover, some embodiments may further include a connector for provision of power and telemetry services to the SV by the LV. The umbilical connector 270 may also provide for SV power, battery charging, and SV telemetry connections to the SV while the SV and LV are still on the ground. The functions of the umbilical connector may also be provided through wireless techniques and devices for the purpose of functional redundancy or if the physical interface is not desired.

Figure 9:
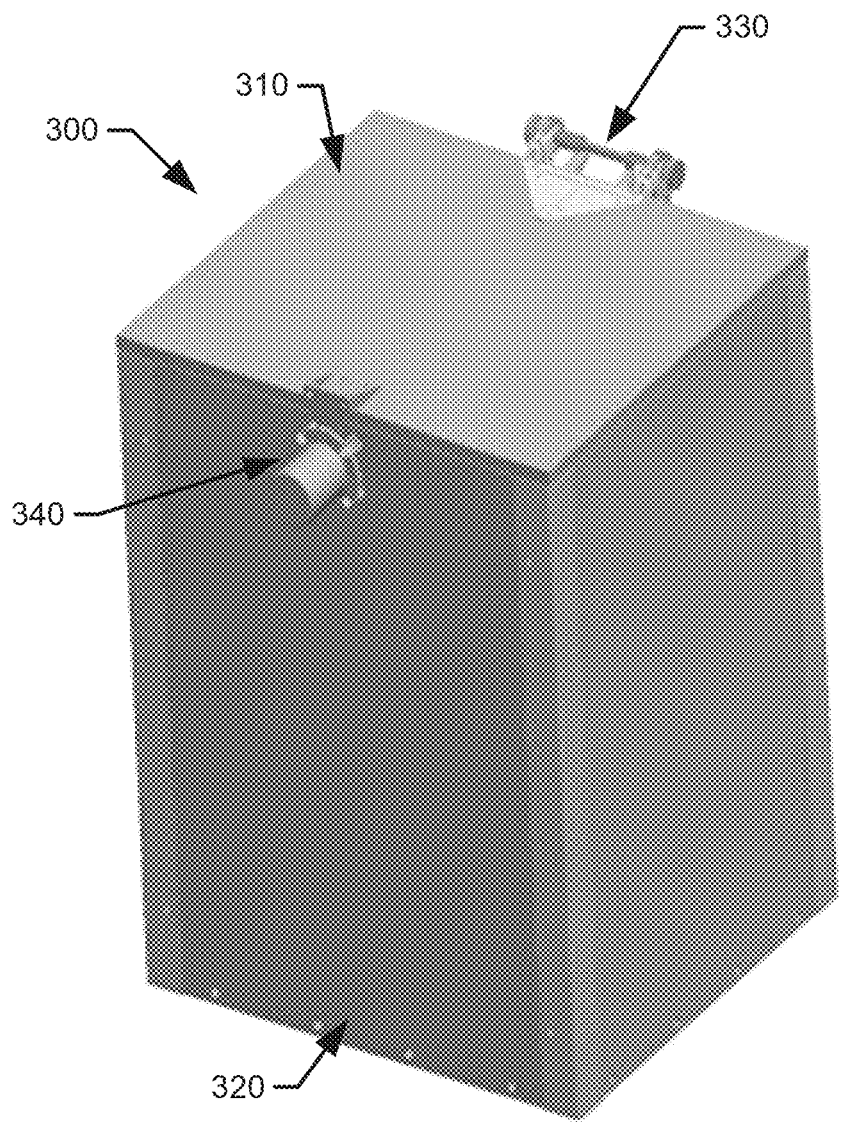
FIG. 9 illustrates a perspective view of an optional shroud that may be attached to the LV adaptor plate of an example embodiment.
Figure 10:
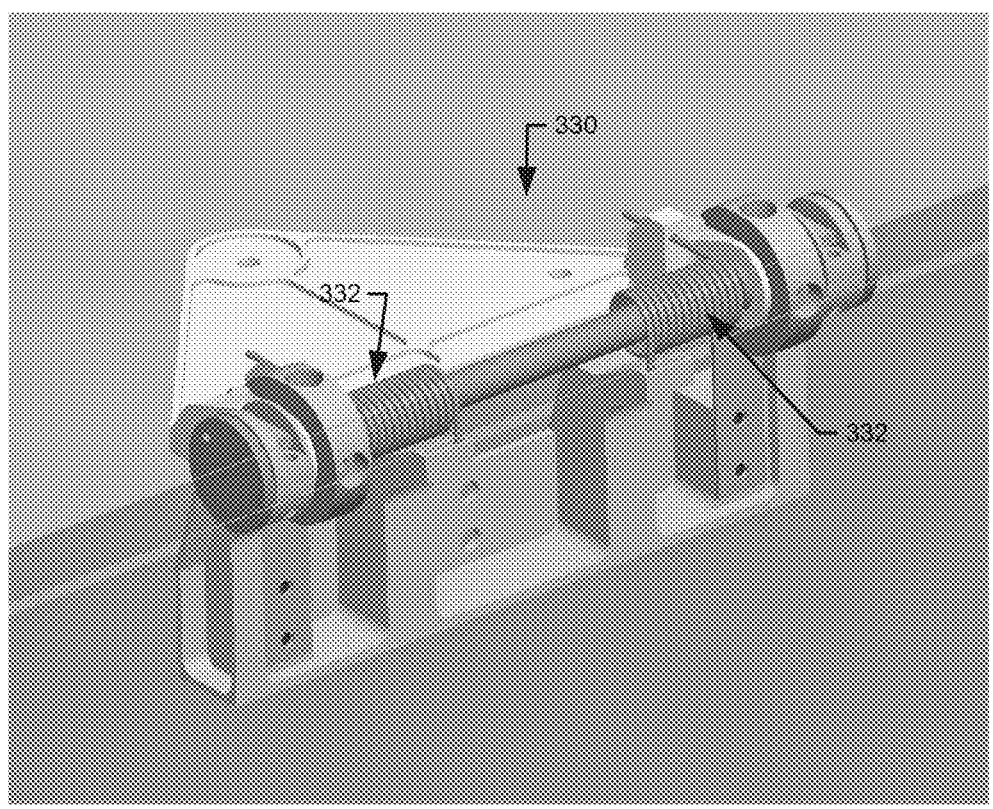
FIG. 10 illustrates a detail perspective view of a hinge employed on the shroud in accordance with an example embodiment.
Figure 11:
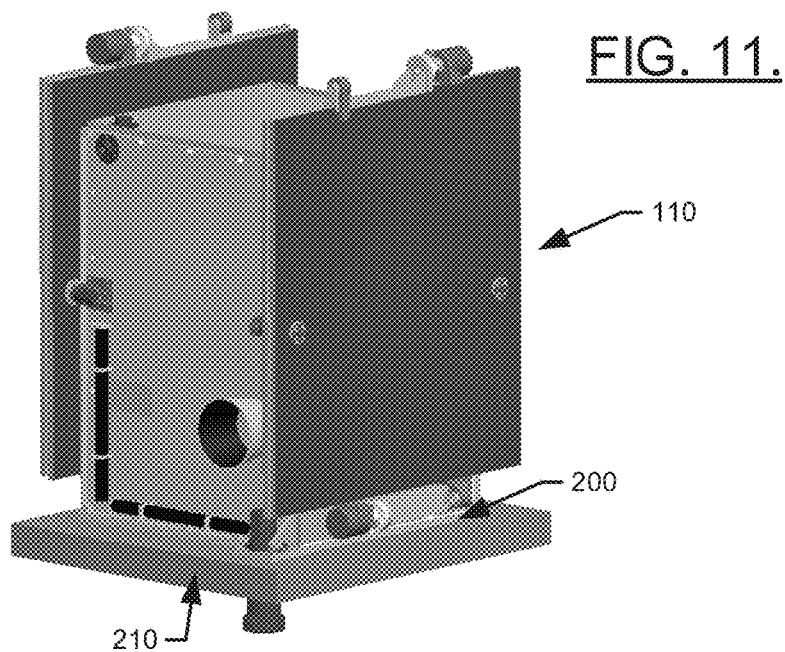
FIG. 11 illustrates a perspective view of an example SV that does not include a shroud in accordance with an example embodiment.
Figure 12:
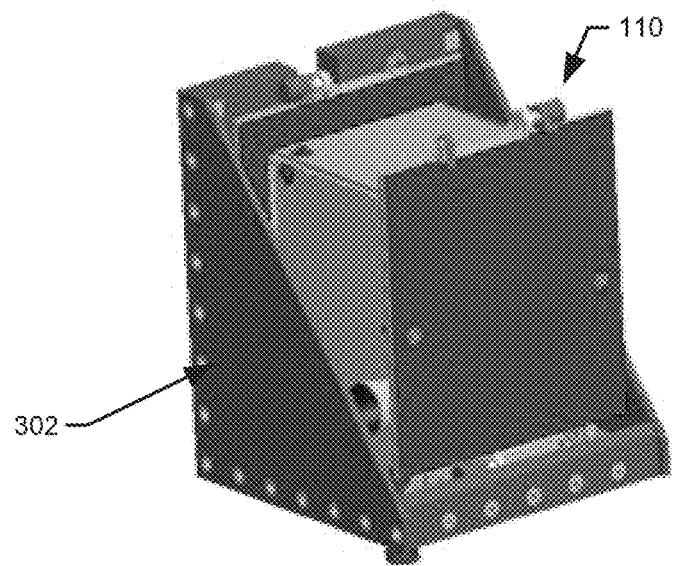
FIG. 12 illustrates an example SV in which a partial shroud is provided to serve as an intermediary secondary structural interface with the LV to orient the SV in accordance with an example embodiment.

FIG. 9 illustrates a perspective view of a shroud that may be attached to the LV adaptor plate 210 of an example embodiment. FIG. 10 illustrates a detail perspective view of a hinge employed on the shroud in accordance with an example embodiment. FIG. 11 illustrates a perspective view of an example SV that does not include a shroud in accordance with an example embodiment. FIG. 12 illustrates an example SV in which a partial shroud is provided in accordance with an example embodiment.

In an example embodiment, an optional shroud 300 may be provided to protect the SV 110 during shipment to the launch site with the LV adaptor plate 210. In this regard, for example, the shroud 300, which may be provided with a door 310 that can be deployed by command, protects the SV 110 from EMI/EMC effects, thermal effects from radiation or mass impingement, acoustic energy, contamination, and with tamper-proofing that would conventionally allow commercial, civil, or Government missions to be launched on a foreign launch vehicle without fear of compromising ITAR issues or OPSEC guidelines. The shroud 300 may also protect a primary payload (if this system is used for a secondary or tertiary payload) from contact with the SV 110 contained in the shroud 300.

The shroud 300 may be attached to the LV adaptor plate 210 around peripheral edges thereof, or may be affixed to the surface of the LV adaptor plate 210 (e.g., the surface that faces toward the SV separation plate 200). In some cases, the shroud 300 may include a removable cover or covers to provide access to propulsion system service valves or various other components of the SV 110. The service valves may be used to pressurize or depressurize a propellant tank and either load or off-load the propellant during field operations.

In some embodiments, the shroud 300 may be a partial shroud (e.g., see partial shroud 302 of FIG. 12). In such an embodiment, the SV 110 may be released and exit the partial shroud 302 without contacting the partial shroud 302. However, in other embodiments, the shroud 300 may fully enclose the payload of the SV 110. In such an embodiment, four sidewalls 320 may be provided so that the sidewalls 320 have substantially the same width as the corresponding lengths of the LV adaptor plate 210. The sidewalls 320 may therefore extend away from the edges of the LV adaptor plate 210 substantially perpendicular to the surface of the LV adaptor plate 210 that faces the SV separation plate 200. The sidewalls 320 may connect to each other along lateral edges thereof to form a continuous enclosure around the lateral sides of the SV 110.

In some cases where a full shroud (e.g., shroud 300 of FIG. 9) is employed, it may be advantageous or required to include the door 310 to facilitate opening of the door 310 to allow the SV 110 to exit the shroud 300. The door 310 may lie in a plane substantially parallel to the plane in which the LV adaptor plate 210 when the door 310 is closed over the SV 110. Thus, the door 310 may lie in a plane that is substantially perpendicular to the direction of extension of the sidewalls 320. In some embodiments, the door 310 may have similar length and width dimensions to that of the LV adaptor plate 210 (but may have a different thickness). Accordingly, the LV adaptor plate 210, in combination with the sidewalls 320 and the door 310 (when closed) may form a complete enclosure around the SV 110. The SV 110 may be connected to or built upon the SV separation plate 200 so that when the door 310 is opened and the separation assembly is activated, the separation nut 265 may release the SV separation plate 200 and the 240 to push the SV separation plate 200 away from the LV adaptor plate 210 with minimal tip off or twisting so that the SV 110 may pass through the opened door 310 and exit the shroud 300 during separation.

In an example embodiment, a hinge 330 may be provided to operably couple the door 310 to one of the sidewalls 320 at a distal end of the corresponding one of the sidewalls 320 (relative to the LV adaptor plate 210). The hinge 330, which is shown in more detail in FIG. 10, may include biasing elements 332 (e.g., springs) configured to bias the door 310 to open. In some embodiments, the biasing elements 332 may be configured to provide sufficient force to push the door 310 open at least 90 degrees (and may be as many as 270 degrees to reduce possibility of re-contact between the SV 110 and the shroud 300) so that the door 310 is cleared out of the way of the SV separation plate 200 and the SV 110 when separation is conducted. In such an example, an actuator 340 may be provided on the door 310 at an opposite side thereof relative to the hinge 330. The actuator 340 may be configured to hold the door 310 shut until actuated, at which time the door 310 may be released so that the biasing elements 332 are free to act to open the door 310.

Accordingly, in some embodiments, the shroud 300 may provide for improved security and safety of the SV prior to release. The improved safety and security may relate to environmental, electromagnetic interference (EMI), thermal, acoustic, mechanical, physical, and visual inspection protection. Thus, for example, the shroud 300 may in some cases further provide EMI/EMC protection features. In such an example, the shroud 300 may act as a Faraday cage when the door 310 is in the closed position. The shroud 300 may have intimate electrical contact to the LV adaptor plate 210 and each of the 4 walls of the shroud 300 may have intimate electrical contact between each other. The door 310 of the shroud 300 may have intimate electrical contact to the rest of the shroud 300 by virtue of an EMI gasket affixed to the door 310 around a periphery thereof.

In an example embodiment, actuation of the actuator 340 may be timed relative to release of the SV separation plate 200 so that the door 310 is ensured to be open when the SV separation plate 200 is separated from the LV adaptor plate 210. Thus, for example, timing of the actuation of the actuator 340 may be coordinated with operation of the separation nuts 265 so that the SV 110 can be released from the shroud 300 without contacting any portion of the shroud 300 during separation. In some embodiments, the actuator 340 may include a pin that is pulled to release the door 310 responsive to actuation of the actuator 340. Thus, for example, the actuator 340 may form an assembly including one portion at the sidewall 320 and one portion at the door 310. In such an example, the pin may extend from the portion of the actuator 340 that is disposed at one of the sidewalls 320 into another portion of the actuator 340 disposed at the door 310 to hold the door shut against the pressure of the biasing elements 332. However, when the actuator 340 is actuated, the pin may withdraw so that the pressure exerted by the biasing elements 332 is no longer restrained, and the door 310 may be opened by the biasing elements 332 operating within the hinge 330. It should be appreciated that the locations of the pin and the portion of the actuator 340 that receives the pin may be switched in alternative embodiments. Thus, the pin may extend from the door 310 to the sidewall 320 or from the sidewall 320 to the door 310.

Conventional release systems tend to be very launch vehicle-specific, especially for different vehicle classes, such as Minotaur I and Falcon 9 Heavy. For example, ULA secondary accommodations differ from those on launch vehicles produced by SpaceX, Orbital and Ariane. The release system architecture of example embodiments described above may enable unification of primary, secondary, and tertiary rideshare opportunity interfaces throughout the industry. The same release system and shrouds may therefore be used in conjunction with a small number of flat plate adaptors or existing ported ring adaptors with any domestic launch vehicles mentioned above as well as many international variants. The release system architecture of an example embodiment also allows a mixed topology between CubeSats, nanosatellites, ESPA, larger primary satellite payloads. Gaining access to ride-share or primary launch opportunities across a large fleet of launch vehicles and the potential for mixed topology missions may enable the industry to make opportunities for small payload launches much more prevalent across the industry.

A release system designed according to an example embodiment may include several unique features. Most satellites, particularly, nanosatellites and microsatellites, have utilized a ring-type separation system. Traditional ring-type separation systems require the SV to either feature a round structural element or to transition from a round element to a polygonal element since most nanosatellite or microsatellite structures are prismatic polygons (squares, rectangles, hexagons or octagons). Nano- and microsatellites are typically too volume constrained to have a center cylinder, so a very thick baseplate or a circle to polygon transition structure is often required. These transition structures are massive, and reduce the available volume for electronics packages. Additionally, mechanical loads in SV structures tend to concentrate along the corners where panels are joined.

Utilizing a flat plate dispenser (e.g., the SV separation plate 200) with a linear Marman-style clamp bar in accordance with an example embodiment may put the hard points between the SV and the LV right at the corners, eliminating the need to build a rigid structure which would react loads between the corners and a circular shape of a traditional ring-type separation system. Even further, by integrating the linear Marman-style clamp bar, the mass of the system may be minimized while packaging volume is maximized. The release system of an example embodiment may therefore utilize a lower number (e.g., one or two high-reliability separation nuts) of releasable components.

By minimizing parts count and greatly simplifying the design of the system, reliability, cost, and mass are optimized. Example embodiments may therefore provide a scalable flat plate release system that can be customized to include, but not limited to, tailored mass properties (e.g., COM, MOI, first mode frequency), cut-outs for local device/feature excursions, tuned deployment dynamics (translational and rotational), telemetry data and commanding, electrical services, environmental contamination control measures, optional instrumentations, monitoring, and mechanisms. By maximizing the scalability and reusability of the flat plate release system described herein, rideshare opportunities may be maximized and cost may be minimized while still providing maximum space for payload(s) to be accommodated.

As such, a system of an example embodiment may include a space vehicle separation plate operably coupled to a space vehicle, a launch vehicle adaptor plate operably coupled to a launch vehicle capable of carrying the space vehicle into space or into a ballistic (non-orbital) trajectory for release of the space vehicle from the launch vehicle, an actuator release mechanism assembly and a biasing element assembly. The actuator release mechanism assembly may be configured to separably couple the space vehicle separation plate to the launch vehicle adaptor plate. The actuator-release mechanism assembly may comprise a clamp assembly configured to clamp an edge of the space vehicle separation plate together with an edge of launch vehicle adaptor plate to fix a surface of the space vehicle separation plate in proximity to a surface of the launch vehicle adaptor plate prior to release of the space vehicle separation plate. The biasing element assembly may be configured to provide a configurable force in a first direction normal to a surface of the launch vehicle adaptor plate to separate the space vehicle separation plate from the launch vehicle adaptor plate when the actuator-release mechanism assembly is triggered to release the space vehicle separation plate from the launch vehicle adaptor plate.

In some example embodiments, the clamp assembly may include a clamp bar, the clamp bar extending along a length of and parallel to the edge of the space vehicle separation plate and the edge of the launch vehicle adaptor plate in order to clamp the edge of the space vehicle separation plate together with the edge of the launch vehicle adaptor plate. In some cases, the clamp bar may be a linear Marman-style clamp bar. Alternatively or additionally, the clamp assembly may further include a preload bar, the preload bar extending parallel along a length of the clamp bar in order to distribute preload force along the length of the clamp bar thereby enabling the clamp bar to uniformly clamp the edge of the space vehicle separation plate together with the edge of the launch vehicle adaptor plate.

Alternatively or additionally, the clamp assembly may further include a retaining clip configured to enable parallel alignment of the clamp bar and the preload bar. In some example embodiments, the actuator-release mechanism assembly may further include a separation assembly for urging the clamp assembly away from the edge of the space vehicle separation plate and the edge of launch vehicle adaptor plate responsive to triggering of the separation assembly to release the space vehicle separation plate from the launch vehicle adaptor plate. In some cases, the separation assembly may include a separation nut and a separation bolt, the separation nut being configured to release the separation bolt responsive to triggering of the separation assembly to release the space vehicle separation plate from the launch vehicle adaptor plate.

Alternatively or additionally, the actuator-release mechanism assembly may further include a clamp pushoff assembly configured to provide a force in a second direction perpendicular to the edge of the clamp assembly to assist in urging the clamp assembly away from the edge of the space vehicle separation plate and the edge of launch vehicle adaptor plate responsive to triggering of the separation assembly to release the space vehicle separation plate from the launch vehicle adaptor plate. In some cases, the clamp pushoff assembly may include a biasing element, the biasing element extending perpendicular to the clamp assembly.

In some example embodiments, the clamp assembly may include a first clamp assembly provided at a first edge of the space vehicle separation plate and the launch vehicle adaptor plate, where the separation assembly may include a first separation assembly provided at the center of the first clamp assembly, and where the clamp pushoff assembly may include a first clamp pushoff assembly, the first clamp pushoff assembly having a first biasing element and a second biasing element provided at respective ends of the first clamp assembly. Additionally, the actuator-release mechanism may further include 1) a second clamp assembly provided at a second edge of the space vehicle separation plate and the launch vehicle adaptor plate, the first edge and second edge being opposite from each other; 2) a second separation assembly provided in the center of the second clamp assembly; and 3) a second clamp pushoff assembly comprising a third biasing element and a fourth biasing element provided at respective ends of the second clamp assembly, where responsive to triggering of the first and second separation assemblies, the first and second separation assemblies in connection with the first and second clamp pushoff assemblies urge the first and second clamp assemblies away from the first and second edge of the space vehicle separation plate and the launch vehicle adaptor plate, respectively. In some cases, the first and second separation assemblies are timed for simultaneous actuation when the first and second separation assemblies are triggered to release the space vehicle separation plate from the launch vehicle adaptor plate. In further example embodiments, the biasing element assembly may include a separation spring including a support rod biased by a spring, the separation spring extending normal to the surface of the launch vehicle adaptor plate such that at least a portion of the separation spring passes through a portion of the launch vehicle adaptor plate. In some cases, the biasing element assembly may include a plurality of biasing elements distributed evenly spaced apart from each other relative to a surface of the launch vehicle adaptor plate. Alternatively or additionally, the space vehicle separation plate and launch vehicle adaptor plate support an umbilical connection or an electronic separation switch assembly to facilitate positive deployment confirmation detection. Alternatively or additionally, the separation springs are tunable for different separation velocities and tip-off rates.

In some example embodiments, the release system may include a shroud configured to at least partially enclose the space vehicle and provide environmental, electromagnetic interference, thermal, acoustic, mechanical, physical, or visual inspection protection. In some cases, the shroud may include sidewalls coupled to respective edges of the launch vehicle adaptor plate and extending substantially perpendicular to a surface of the launch vehicle adaptor plate that faces the space vehicle separation plate prior to release of the space vehicle separation plate from the launch vehicle adaptor plate. Alternatively or additionally, the shroud may be open at least on one side. Alternatively or additionally, the sidewalls may enclose all sides of the space vehicle. Alternatively or additionally, the shroud may be configured to support a purge environment.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A release system comprising:
a space vehicle separation plate operably coupled to a space vehicle;
a launch vehicle adaptor plate operably coupled to a launch vehicle capable of carrying the space vehicle into space or into a ballistic trajectory for release of the space vehicle from the launch vehicle in multiple orientations and with tunable relative velocity;
an actuator-release mechanism assembly configured to separably couple the space vehicle separation plate to the launch vehicle adaptor plate, the actuator-release mechanism assembly comprising a clamp assembly configured to clamp an edge of the space vehicle separation plate together with an edge of launch vehicle adaptor plate to fix a surface of the space vehicle separation plate in proximity to a surface of the launch vehicle adaptor plate prior to release of the space vehicle separation plate; and
a biasing element assembly configured to provide a force in a first direction normal to a surface of the launch vehicle adaptor plate to separate the space vehicle separation plate from the launch vehicle adaptor plate when the actuator-release mechanism assembly is triggered to release the space vehicle separation plate from the launch vehicle adaptor plate.

2. The release system of claim 1, wherein the clamp assembly comprises a clamp bar, the clamp bar extending along a length of and parallel to the edge of the space vehicle separation plate and the edge of the launch vehicle adaptor plate in order to clamp the edge of the space vehicle separation plate together with the edge of the launch vehicle adaptor plate.

3. The release system of claim 2, wherein the clamp bar is a linear Marman-style clamp bar.

4. The release system of claim 2, wherein the clamp assembly further comprises a preload bar, the preload bar extending parallel along a length of the clamp bar in order to distribute preload force along the length of the clamp bar thereby enabling the clamp bar to uniformly clamp the edge of the space vehicle separation plate together with the edge of the launch vehicle adaptor plate.

5. The release system of claim 4, wherein the clamp assembly further comprises a retaining clip configured to enable parallel alignment of the clamp bar and the preload bar.

6. The release system of claim 1, wherein the actuator-release mechanism assembly further comprises a separation assembly for urging the clamp assembly away from the edge of the space vehicle separation plate and the edge of launch vehicle adaptor plate responsive to triggering of the separation assembly to release the space vehicle separation plate from the launch vehicle adaptor plate.

7. The release system of claim 6, wherein the separation assembly comprises a separation nut and a separation bolt, the separation nut being configured to release the separation bolt responsive to triggering of the separation assembly to release the space vehicle separation plate from the launch vehicle adaptor plate.

8. The release system of claim 6, wherein the actuator-release mechanism assembly further comprises a clamp pushoff assembly configured to provide a force in a second direction perpendicular to the edge of the clamp assembly to assist in urging the clamp assembly away from the edge of the space vehicle separation plate and the edge of launch vehicle adaptor plate responsive to triggering of the separation assembly to release the space vehicle separation plate from the launch vehicle adaptor plate.

9. The release system of claim 8, wherein clamp pushoff assembly comprises a biasing element, the biasing element extending perpendicular to the clamp assembly.

10. The release system of claim 8, wherein the clamp assembly comprises a first clamp assembly provided at a first edge of the space vehicle separation plate and the launch vehicle adaptor plate, wherein the separation assembly comprises a first separation assembly provided at the center of the first clamp assembly, wherein the clamp pushoff assembly comprises a first clamp pushoff assembly, the first clamp pushoff assembly having a first biasing element and a second biasing element provided at respective ends of the first clamp assembly, wherein the actuator-release mechanism further comprises:
 a second clamp assembly provided at a second edge of the space vehicle separation plate and the launch vehicle adaptor plate, the first edge and second edge being opposite from each other;
 a second separation assembly provided in the center of the second clamp assembly;
 and a second clamp pushoff assembly comprising a third biasing element and a fourth biasing element provided at respective ends of the second clamp assembly, wherein responsive to triggering of the first and second separation assemblies, the first and second separation assemblies in connection with the first and second clamp pushoff assemblies urge the first and second clamp assemblies away from the first and second edge of the space vehicle separation plate and the launch vehicle adaptor plate, respectively.

11. The release system of claim 8, wherein the first and second separation assemblies are timed for simultaneous actuation when the first and second separation assemblies are triggered to release the space vehicle separation plate from the launch vehicle adaptor plate.

12. The release system of claim 1, wherein the biasing element assembly comprises a separation spring including a support rod biased by a spring, the separation spring extending normal to the surface of the launch vehicle adaptor plate such that at least a portion of the separation spring passes through a portion of the launch vehicle adaptor plate.

13. The release system of claim 12, wherein the biasing element assembly comprises a plurality of biasing elements distributed evenly spaced apart from each other relative to a surface of the launch vehicle adaptor plate.

14. The release system of claim 12, wherein the space vehicle separation plate and launch vehicle adaptor plate support an umbilical connection or an electronic separation switch assembly to facilitate positive deployment confirmation detection.

15. The release system of claim 12, wherein the separation springs are tunable for different separation velocities and tip-off rates.

16. The release system of claim 1, further comprising a shroud configured to at least partially enclose the space vehicle and provide environmental, electromagnetic interference, thermal, acoustic, mechanical, physical, or visual inspection protection.

17. The release system of claim 16, wherein the shroud comprises sidewalls coupled to respective edges of the launch vehicle adaptor plate and extending substantially perpendicular to a surface of the launch vehicle adaptor plate that faces the space vehicle separation plate prior to release of the space vehicle separation plate from the launch vehicle adaptor plate.

18. The release system of claim 17, wherein the shroud is open at least on one side.

19. The release system of claim 17, wherein the sidewalls enclose all sides of the space vehicle.

20. The release system of claim 17, wherein the shroud is configured to support a purge environment.

* * * * *